Patented Dec. 13, 1927.

1,652,353

UNITED STATES PATENT OFFICE.

WILLIAM F. GRAUL, OF NORTHAMPTON, MASSACHUSETTS.

WOOD FILLER FOR LACQUERS.

No Drawing. Application filed November 29, 1922, Serial No. 604,085. Renewed March 27, 1925.

This invention relates to a wood filler adapted for preparation of wood surfaces to receive a finishing coat of lacquer, varnish, and the like. By the term lacquer, is meant any one of the well known nitro cellulose solutions commonly used like a varnish to protect the surfaces of wood, metals, etc.

Such lacquers have heretofore been successfully employed as a finishing or protecting coat for metals, and to a somewhat more limited extent for wood. The field of usefulness for wood, however, has been restricted, due to the absence of a suitable wood filler which would act compatibly with the lacquer as a finishing coat and serve the same function as well known fillers of an oily base commonly used to prepare wood surfaces to receive a varnish. A wood filler suitable for the ordinary varnish is found to be very unsuitable for a lacquer due to the oily constituents of such wood fillers which do not combine harmoniously with the lacquer. The object of the present invention, therefore, is to produce a wood filler which will have a chemical affinity for a lacquer of nitro cellulose base and thus work compatibly therewith. A further object of the invention is to produce a wood filler of the character mentioned which may have incorporated therein a coloring material so that when a colored surface for the wood is desired, the application of the filler will serve to both color and fill the surface thereof.

For this purpose, I have found that a satisfactory wood filler can be made up of one of the soluble cellulose esters, such as the nitrate or acetate, preferably the nitrate, in solution with any one of its suitable solvents, such as a mixture of ether and alcohol, ecetone, methyl alcohol, ethyl acetate, or amyl acetate, said solution being mixed with suitable proportions of pumice and asbestos, both ground very fine like a flour. When it is desired to have a colored surface for the wood a suitable aniline dye is incorporated in the solution, the spirit solvent acting as a satisfactory vehicle for impregnating the wood surface with said aniline dye. For the nitro cellulose base, any well known pyroxyline solution may be employed as well as scrap celluloid dissolved in ethyl or amyl acetate. I preferably use scrap celluloid as a base because of its cheapness, and use preferably as a solvent therefor, amyl acetate because of its quick drying quality.

In making up this composition, it will be convenient to first thoroughly mix and grind together the pumice and asbestos with the aniline dye, when the latter is used, and also sufficient solvent, i. e., amyl acetate, to form a paste. When this material is thoroughly mixed and ground together, scrap celluloid may be added, together with more of the solvent, i. e., amyl acetate, to form the final product in liquid form. In place of the scrap celluloid, dissolved in amyl acetate above referred to, any commercial lacquer of nitro cellulose composition now on the market, may be employed, but the latter is more expensive.

The proportions of the ingredients so compounded and mixed together, may for satisfactory results, be approximately as follows:

1 ounce of pulverized asbestos, 6 ounces of pulverized pumice, ½ ounce of celluloid scrap, 1 pint of amyl acetate (which will weigh about 1¼ pounds).

It will, of course, be understood that the above proportions, need not be rigidly adhered to for satisfactory results, but are merely those which I have found to be best in actual practice. Furthermore, either the pumice or asbestos might be omitted from the composition, but superior results are obtained by the use of both of said ingredients as stated. The amount of aniline dye added to the compound is of course determined by the degree and quality of the color desired.

For the application of the above described filler to a wood surface, said surface should preferably be rubbed smooth as with the application of any other filler. The present filler may then be applied in any suitable way as by brushing or spraying, and after such application and before the filler is thoroughly dried, it should be thoroughly rubbed into the wood, said rubbing action preferably being effected against the grain of the wood.

The filler applied in this manner will dry very much more quickly than ordinary wood fillers heretofore used with varnishes, said drying action when amyl acetate is used as the solvent will take place in from two to three minutes. This quick drying action of the filler contributes in a large degree to its usefulness and economy, for it shortens the process of finishing the surface. A further economy of time results from the use of this filler in cases where the surface of the wood is to be colored, for in such a case the aniline dye being incorporated in the filler will serve to color the wood at the same time that it is being filled, thus requiring but one operation for both coloring and filling. Heretofore a wood surface had to be separately stained and filled in preparation for the usual varnish coating.

After the filler has dried, the lacquer finishing coat may be applied in the usual way, as by spraying or dipping, and it will be found that one, or at most, two coats of said lacquer will be amply sufficient to give a most satisfactory finished surface. It is this feature of the filler which makes it advantageous to use in the finishing of wood surfaces, namely, its quality of drying quickly, and its quality of so preparing the wood surface as to require a minimum number of finishing coats of lacquer. Heretofore a lacquer finish for wood surfaces could only be accomplished by the application of a great many coats of the lacquer, and even then, satisfactory results were not always obtained for wood surfaces of large pieces, such as furniture and the like. By the use of the present filler as above described, any wood surface such as has been heretofore finished with varnish, paint, or shellac, may be most satisfactorily finished with a coat of lacquer, giving it a highly polished, glossy appearance, heretofore obtained only by the most expensively applied varnishes. However, the present filler may also be satisfactorily used in preparing the wood surface for the ordinary coat of varnish or shellac when desired.

While in the description of my invention, the chemical ingredients used have been specified with some particularity for purposes of complete disclosure, I desire that the appended claims be construed broadly enough to include such chemical equivalents for the substances mentioned as would be obvious to those skilled in the art.

What I claim is:

1. A wood filler for lacquers and the like comprising, a soluble cellulose ester mixed with pulverized pumice and pulverized asbestos.

2. A wood filler for lacquers and the like comprising, a soluble cellulose ester mixed with pulverized pumice and pulverized asbestos and an aniline dye for coloring the same.

3. A wood filler for lacquers and the like comprising, a nitro cellulose in solution mixed with pulverized asbestos and pulverized pumice.

4. A wood filler for lacquers and the like comprising, nitro cellulose in solution mixed with pulverized asbestos and pulverized pumice and an aniline dye for coloring the same.

5. A wood filler for lacquers and the like comprising, nitro cellulose dissolved in amyl acetate and mixed with pulverized asbestos and pulverized pumice.

6. A wood filler for lacquers and the like comprising, celluloid scrap dissolved in amyl acetate and mixed with pulverized asbestos and pulverized pumice.

7. A wood filler for lacquers and the like comprising, celluloid scrap dissolved in amyl acetate and mixed with pulverized asbestos and pulverized pumice and an aniline dye for coloring the same.

8. A wood filler for lacquers and the like comprising, a composition of materials in approximate proportions as follows: 1 ounce of pulverized asbestos, 6 ounces of pulverized pumice, ½ ounce of celluloid, 1 pint of amyl acetate.

9. A wood filler for lacquers and the like comprising a solution of a cellulose ester in a liquid hydrocarbon solvent and mixed with mineral material including a major proportion of pulverized pumice.

In testimony whereof I have affixed my signature.

WILLIAM F. GRAUL.